May 23, 1939.　　　　　C. E. SHOUP　　　　　2,159,454
LICENSE PLATE FASTENER
Filed Nov. 13, 1937

Inventor
C. E. Shoup.
By Lacey & Lacey,
Attorneys

Patented May 23, 1939

2,159,454

UNITED STATES PATENT OFFICE 2,159,454

LICENSE PLATE FASTENER

Charles E. Shoup, Quincy, Ill.

Application November 13, 1937, Serial No. 174,464

6 Claims. (Cl. 24—255)

This invention relates to a license plate fastener and the present application constitutes a continuation in part of my prior application, Serial No. 756,750, filed December 18, 1924, and allowed June 6, 1925.

One object of the invention is the provision of a securing device which may be easily applied to the license plate and a portion of the frame of the automobile and, when applied, will automatically assume a locking position to retain the plate firmly in position.

Another object of the invention is to provide a simple securing device which will effectually retain the license plate in place and will not be dislodged under the most severe usage while it may be readily removed by the use of simple tools when a license plate is to be changed, and will be practically indestructible.

The invention is illustrated in the accompanying drawing and consists in certain novel features which will be hereinafter first fully described and then particularly pointed out in the appended claims.

Figure 1:
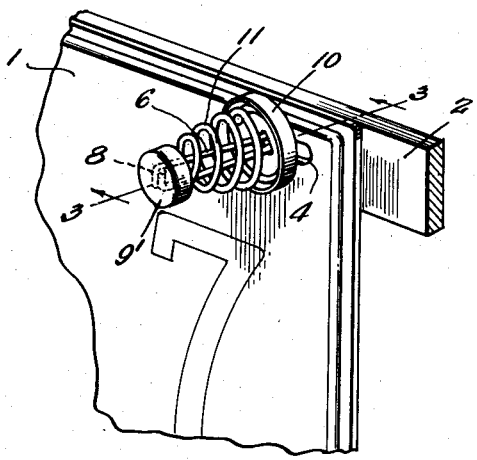
Figure 1 is a perspective view looking at the outer face of a corner portion of a license plate held by a fastening device constructed in accordance with this invention.
Figure 2:
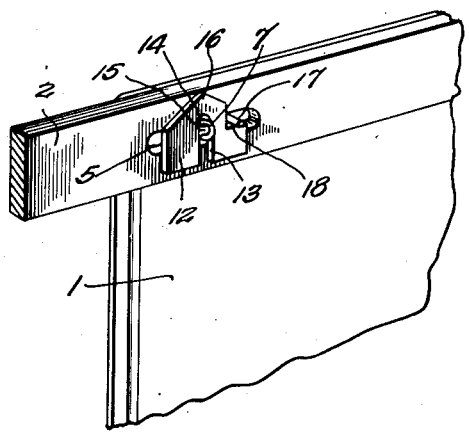
Figure 2 is a perspective view looking at the inner face of the license plate.
Figure 3:
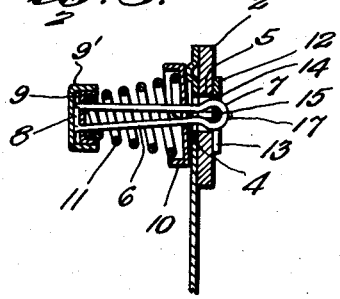
Figure 3 is an enlarged section upon the line 3—3 of Figure 1.
Figure 4:
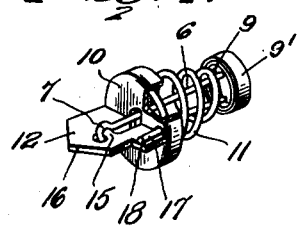
Figure 4 is a perspective view of the securing device as it appears before being applied.

In the drawing, the reference numeral 1 indicates a license plate, and the reference numeral 2 indicates a cross bar or fender strip which extends across the front of an automobile in advance of the radiator. The license plate is provided in each upper corner portion with a horizontally extending slot 4 adjacent its upper edge as is usual, and in the present illustration of the invention corresponding slots 5 are provided in the fender strip or frame bar 2. A securing device embodying the invention and constructed as illustrated in Figures 1 through 4, comprises a shank or stem 6 which may conveniently be a stout wire doubled upon itself to provide an elongated flat loop having an eye 7 at one end and having its opposite end provided with laterally extending stops 8 retaining a cup-shaped washer or abutment plate 9 upon the stem, the said abutment plate or washer being, of course, provided with suitable openings whereby the plate may be fitted upon the stem. A cap 9' fits about the washer 9 to cover the abutments 8 and permit pressure to be applied with a thumb without bruising the thumb. A second larger cup-shaped washer or abutment plate 10 is fitted upon the stem near the eye 7 and may slide longitudinally of the stem, a coiled spring 11, preferably of conical form, being disposed around the stem between the two washers or abutments and bearing at its ends against the respective abutments. Carried by the eye is a locking plate 12 which, when the device is applied, is adapted to extend across the slot 5 in the frame bar 2 and engage the said frame bar at the back thereof, as shown in Figures 2 and 3. This locking plate is provided with a notch 13 in one edge and with an opening 14 through its body adjacent the inner end of the said notch so that in assembling the device, the ends of the stem 6 may be engaged through the said opening and the notch, respectively, and the eye brought into pivotal engagement with the portion 15 of the locking plate between the notch and said opening and thereby pivotally support the locking plate, the stem being subsequently assembled with the abutments and the spring in an obvious manner. The edge of the locking plate having the notch 13 formed therein is slightly shorter than the slots 4 and 5 so that the plate, when turned to the position shown in Figure 4 and disposed in the plane of the slots and in alinement therewith, may be readily pushed through the slots, but, if the plate be turned, as shown in Figures 2 and 3, the edges of the plate will be disposed, respectively, above and below the slots and withdrawal of the plate will be prevented. The notched edge of the plate in the operative position thereof is the lower edge, and the opposite edge is tapered to form a substantially inverted V-shaped leaf 16, the notched edge of the plate being, consequently, heavier than the opposite edge for a purpose which will presently appear. The outer end of the spring 11 may be attached to the abutment plate 9 or may simply bear against it, as may be preferred, and the opposite end of the spring may be likewise disposed relative to the abutment plate 10, but I prefer and have illustrated the latter end of the spring as being extended through the abutment plate and projecting beyond the same to provide a stop pin or stud 17 adapted to bear against the upper face of the locking plate 12 when the latter is arranged as shown in Fig. 4, and to engage in a recess 18 in the upper edge of the plate when the same is applied as shown in Fig. 3. This stud may, of course, be formed upon the plate 10, but the construction shown is exceedingly cheap and possesses the required efficiency.

The spring 11 tends constantly to expand and, therefore, when the parts are arranged as shown in Fig. 4, before being applied to the license plate and the frame bar, the abutment plate 10 will be held against the edge of the locking plate with sufficient force to prevent turning of the locking plate inasmuch as it will be clamped in place between the said abutment plate and the inner wall of the eye 7 of the stem. The stud or stop pin 17 serves as a guide in applying the device as it should be above the locking plate when the latter is engaged in and pushed through the slots 4 and 5 in the license plate and the frame bar, respectively. In applying the device, it is held in the position shown in Fig. 4 and the locking plate pushed through the alined slots 4 and 5, as will be understood from what has been said. The applying force is exerted until the notched edge of the locking plate clears the rear side of the frame bar 2, whereupon the greater weight of said edge will cause the same to swing downwardly and the locking plate assume a relatively vertical position so that, if the spring 11 be then permitted to expand, the stem 6 will be drawn forwardly and the locking plate held firmly against the rear side of the frame bar, the abutment plate 10 being at the same time pressed firmly against the face of the license plate, as shown clearly in Figures 2 and 3. When the locking plate is pushed through the license plate and the frame bar, the stud 17, of course, also passes through said parts and, when the pressure upon the locking plate is relieved and the plate swings into its operative locking position, the stud 17 enters in the recess 18 in the tapered edge of the locking plate. Rotation of the securing device is, consequently, prevented inasmuch as very slight rotation will cause the stud to engage either the upper or the lower wall of the slot 5 and relative movement of the locking plate will be prevented from its engagement with the said stud and with the eye 7 of the stem 6. When the license plate becomes out of date and a new license plate is to be substituted therefor, any convenient tool, such as a screw driver, may be used as a pry to engage between the rear of the frame bar and the locking plate to cause the same to swing to a horizontal position as a compressing force is applied to the outer end of the stem 6 and the abutment plate 9. When the locking plate has been thus returned to a horizontal position in alinement with the slot 5, release of the pressure upon the abutment plate 9, while the pry is held against the locking plate, will cause the notched edge of the plate to again enter the slot 5. The pry may then be removed and the device withdrawn from the frame bar and the license plate.

From the foregoing description it will be noted that I have provided an exceedingly simple fastening device which may be easily applied to secure a license plate in position without marring the face of the plate or causing any mutilation of the plate itself. The device will automatically lock the parts together when it is applied and will effectually retain the plate in position notwithstanding rough usage and travel over bad roads. The device is practically indestructible and may be used repeatedly and, as it cannot become accidentally detached, loss of the license plate will be prevented.

Figure 5:
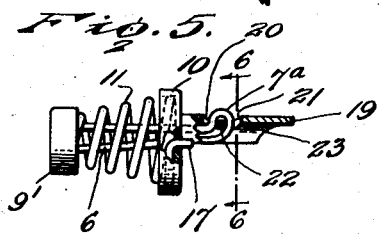
Figure 5 is a view in side elevation of a fastener of a modified construction with portions in section.
Figure 7:
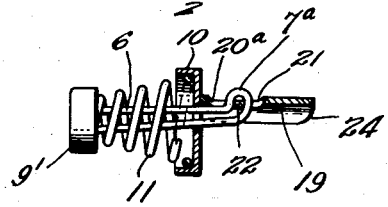
Figure 7 is a view partially in side elevation and partially in section of another modified form of fastener.
Figure 6:
Figure 6 is a view taken along the line 6—6 of Figure 5.

In Figures 5, 6 and 7, there have been illustrated fasteners of a modified construction. In these figures many elements of the fastener are the same as those previously described and illustrated in Figures 1 through 4. Therefore, corresponding parts have been indicated by corresponding reference numerals. In the modified construction, a bar takes the place of the plate 16 and is adapted to move of its own weight from a position in which it extends longitudinally of the shank or stem 6 to a securing position transversely thereof. This bar, which is indicated by the numeral 19, in Figs. 5 and 6, is formed from an elongated plate or blank of strong metal bent transversely, as shown in Fig. 6, so that it is U-shaped in cross section. Openings 20 and 21 corresponding to the slot 13 and opening 14 are formed in the bar 19 in spaced relation to each other to provide a portion 22 corresponding to the portion 15 of the plate 12 so that the eye at the end of the stem or shank 6 may engage through the openings 20 and 21 with the pivot portion 22 extending through the eye. Attention is called to the fact that the eye of the shank or stem, which has been indicated by the numeral 7a, extends laterally of the stem to project from one side thereof so that when the securing bar is turned to the position shown in Fig. 5, it will extend longitudinally of the stem in close contacting engagement therewith and the eye and adjacent portions of the stem or shank lie between the side walls of the bar. This arrangement of parts, which is clearly shown in Figs. 5 and 6, permits the bar and shank to be very easily passed through the alined slots of a license plate and supporting bar and pressure may then be applied to the cap 9' to compress the spring 11 and permit the securing bar to tilt downwardly of its own weight to a position in cross relation to the shank. The end of the securing bar which bears against the washer 10 when the bar is disposed longitudinally of the shank or stem is cut straight across so that it will have firm contacting engagement with the washer and thus prevent the bar from accidentally tilting while being passed through the alined slots of the license plate and the supporting bar 2 of an automobile. The other end portion of the bar is cut diagonally from the edge faces of the side walls of the bar, as shown at 23, thus providing the bar with a tapered end portion which can be easily passed through the slots of the license plate and its supporting bar. It should also be noted that when the securing bar 19 is tilted to a securing position in which the edge faces of its walls bear against the washer 10, the diagonally extending edge faces of the tapered portion 23 of this bar will extend away from the washer and a screw driver or the like can be very easily engaged between the washer and the tapered end of the securing bar to swing the securing bar to the position shown in Fig. 5. The fastener illustrated in Figure 7 is of the same construction as that shown in Figs. 5 and 6 except for the fact that the opening 20a extends longitudinally of the securing bar a greater distance than the corresponding opening 20 and the bar instead of having one end portion cut diagonally, as shown at 23 in Fig. 5, has ends of its walls rounded, as shown at 24. These rounded end portions of the securing bar curve away from the plate 10 when this bar is in the securing position and permits the blade of a screw driver to be very easily forced between the securing bar and the washer when it is desired to tilt the bar to the position shown in Figure 7.

It is to be understood that, while I have shown and described the device as securing an automobile license plate and it is intended primarily for such purpose, its usefulness is not restricted to such field and it may be used wherever two parts are to be secured together.

Having thus described the invention, what is claimed as new is:

1. A fastening device comprising a stem to be inserted through parts to be connected, a locking plate pivotally mounted upon one end of the stem, the pivot for said locking plate being in offset relation to the center of the plate whereby the plate is overbalanced and tends to assume a vertical position extending across the plane of the stem, an abutment plate slidably mounted upon the stem, and means carried by the stem for yieldably holding the abutment plate in engagement with an edge of the locking plate whereby to temporarily maintain the locking plate in the plane of the stem.

2. A fastening device comprising a stem, a locking plate pivotally mounted in offset relation to its center upon one end of the stem and hereby overbalanced, abutment plates mounted on the stem, and an expansion spring carried by the stem between said abutment plates and in contact therewith whereby to hold one of said plates in engagement with the locking plate to yieldably maintain the locking plate in the plane of the stem.

3. A fastening device comprising a stem having an eye at one end, a locking plate pivotally engaged in said eye in offset relation to its center and thereby overbalanced, the heavier portion of the locking plate being notched to receive the stem whereby the plate may be swung from a normal position transversely of the stem into the plane of the stem in rear of the eye with its opposite edge projecting beyond the eye, an abutment plate carried by the opposite end of the stem, a second abutment plate slidably mounted on the stem adjacent the eye, and an expansion spring disposed between the two abutment plates and holding the second-mentioned abutment plate in engagement with the locking plate to yieldably maintain the same in the plane of the stem.

4. A fastening device comprising a stem, a locking plate pivotally mounted for swinging movement at one end of the stem, said locking plate having a tapered longitudinal outer edge extending transversely of the stem and having a central notch in its inner longitudinal edge whereby the plate will be normally swung to a position at right angles to the stem and may be tilted about its pivot and disposed in the plane of the stem with the tapered edge projecting beyond the stem, said tapered edge having a recess near one end, an abutment plate carried by the opposite end of the stem, a second abutment plate disposed adjacent that end of the stem which carries the locking plate, an expansion spring disposed about the stem between and bearing against the abutment plates, and a stud projecting from the second-mentioned abutment plate to bear upon the face of the locking plate in one position of the latter and engage the recess in the tapered edge of the same in another position thereof.

5. A fastening device comprising a stem to be passed through parts to be connected, an eye at one end of said stem offset laterally thereof, an abutment at the other end of said stem, a shiftable abutment slidable along said stem, a spring about the stem between the abutments urging the shiftable abutment towards said eye, and a securing bar substantially U-shape in cross section and formed with openings loosely receiving the eye with a portion of the bar between the openings extending through the eye to pivotally mount the securing bar for tilting movement from a position longitudinally of the bar to a position transversely thereof, one end portion of the bar being beveled from lower edges of side walls of the bar to provide the bar with a tapered end portion extending in diverging relation to the shiftable abutment when the securing bar is disposed transversely of the stem and engaged by the shiftable abutment.

6. A fastening device comprising a stem having a laterally offset eye at one end, a stationary abutment carried by said stem, a shiftable abutment slidable along said stem, a spring about the stem between the abutments and urging the shiftable abutment towards said eye, and a securing bar loosely carried by the eye for tilting movement from a position longitudinally of the stem to a position transversely thereof, said bar having one end portion rounded to extend in diverging relation to the shiftable abutment when the bar is disposed transversely thereof.

CHARLES E. SHOUP.